Patented Dec. 29, 1931

1,838,879

UNITED STATES PATENT OFFICE

FRITZ STRAUB AND WALTER ANDERAU, OF BASEL, SWITZERLAND, ASSIGNORS TO SOCIETY OF CHEMICAL INDUSTRY IN BASLE, OF BASEL, SWITZERLAND

DIHYDROXY-DISULPHO-1:2:2′:1′ DINAPHTHAZINE AND THE PROCESS OF MAKING SAME

No Drawing. Application filed August 26, 1929, Serial No. 388,619, and in Switzerland September 8, 1928.

The present invention relates to new intermediate products. It comprises the process of making these new products as well as the new products themselves.

It has been found that valuable new intermediate products useful for the production of dyestuffs are obtained by esterifying β-aminonaphthols, which contain one sulfo group, in the hydroxyl group, treating the ester thus obtained with an oxidizing agent in an aqueous solution, and then subjecting the azine-like condensation products thus obtained to a treatment with a saponifying agent.

As particularly valuable has proved to be the azine-like condensation product obtained by subjecting the 2-amino-5-hydroxynaphthalene-7-sulfonic acid to the above described treatment.

For the manufacture of azo-dyestuffs these new azine-like condensation products may also be used unsaponified, as esters.

The following example illustrates the invention, the parts being by weight:—

*Example.*—239 parts of 2-amino-5-hydroxynaphthalene-7-sulfonic acid are dissolved in 300 parts of caustic soda solution of 30 per cent. strength and 700 parts of water, 224 parts of para-toluenesulfonic chloride are added and the whole is heated to 95° C. until the last-named body has disappeared. After cooling to 18° C. there is added an alkali-hypochlorite solution containing 105–130 parts of active chlorine and the temperature is controlled at 20–25° C. by addition of ice. There separates a yellow crystalline body which is isolated. It is apparently the di-para-toluene-sulfonic ester of 5:5′-dioxy-7:7′-disulpho-1:2′:1′:2-di-naphthazine. By saponification with 1000 parts of caustic soda solution of 5 per cent. strength at the boiling point the corresponding dihydroxy-disulfoazine is obtained. It is soluble in dilute acids and in water to a yellow solution, in alkalies to a red and in concentrated sulfuric acid to a green solution. By addition of a reducing agent to the alkaline solution, there is obtained the dihydroazine which dissolves to an orange solution. The dihydroxysulfoazine from 2-amino-5-naphthol-7-sulfonic acid combines with a diazo-compound once or twice.

If instead of the above-named 2:5:7-aminonaphthol-sulfonic acid there is used the isomeric 2-amino-8-hydroxy-naphthalene-6-sulfonic acid and the operation is conducted otherwise as described above, there is obtained 8:8′-dihydroxy-6:6′-disulpho-1:2′:1′:2-dinaphthazine. This compound is very sparingly soluble in water to a yellow solution, is very sparingly soluble in alkalies to a red solution and is soluble in concentrated sulfuric acid to a green solution. In alkali hydrosulfite it yields an orange solution of the dihydroazine derivative.

Obviously the OH-group may be esterified by some other esterifying agent and instead of carrying out the oxidation with hypochlorite it may be carried out with another oxidizing agent in an aqueous solution.

What we claim is:—

1. Process for the manufacture of new intermediate products, consisting in esterifying in the hydroxyl group β-aminonaphthols of the general formula

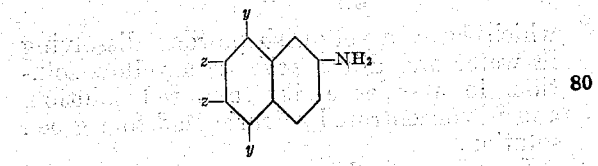

wherein one $y$ stands for an OH-group and the other for an hydrogen atom, one $z$ for an $SO_3H$-group, and the other $z$ for an hydrogen atom, and in which the OH-group and the $SO_3H$-group stand in meta-position to each other, then treating the ester with a halogen containing oxidizing agent, and finally subjecting the azine-like condensation products thus obtained to a treatment with a saponifying agent.

2. Process for the manufacture of new intermediate products, consisting in esterifying in the hydroxyl group the 2-amino-5-hydroxynaphthalene-7-sulfonic acid, then treating the ester with a halogen containing oxidizing agent, and finally subjecting the azine-like condensation products thus obtained to a treatment with a saponifying agent.

3. As new products the azine-like condensation products of the general formula

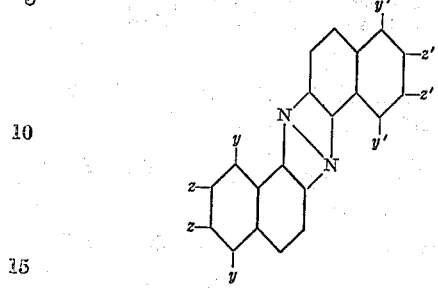

wherein one $y$ stands for an OH-group, and the other for an hydrogen atom, one $z$ for an $SO_3H$-group, and the other for an hydrogen atom, and in which the OH-group and the $SO_3H$-group stand in meta-position to each other, and in which $y'$ and $z'$ have the same signification as $y$ and $z$ and take up the same positions in the corresponding naphthalene nucleus, which products form yellowish powders which dissolve in water and dilute acids to yellow solutions, in alkalies to red solutions, and in concentrated sulfuric acid to green solutions.

4. As a new product the azine-like condensation product of the formula

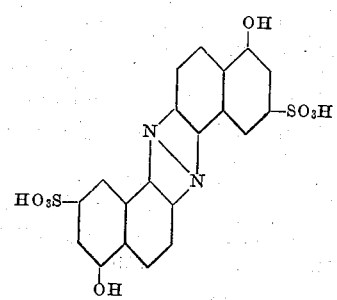

which forms a yellowish powder, dissolving in water and dilute acids to a yellow solution, in alkalies easily to a red solution, and in concentrated sulfuric acid to a green solution.

In witness whereof we have hereunto signed our names this 14th day of August 1929.

FRITZ STRAUB.
WALTER ANDERAU.